United States Patent [19]

Grotte

[11] Patent Number: 4,621,972
[45] Date of Patent: Nov. 11, 1986

[54] SILO MOVER

[76] Inventor: Walter D. Grotte, Box 72, Finley, N. Dak. 58230

[21] Appl. No.: 702,478

[22] Filed: Feb. 19, 1985

[51] Int. Cl.$^4$ .............................................. B60P 1/16
[52] U.S. Cl. .................................. 414/477; 52/118;
52/122; 52/143; 52/197; 280/414.5; 280/426;
280/774; 280/91; 298/12; 414/476; 414/481;
414/483; 414/491; 414/495; 414/498; 414/469;
414/910; 414/919; 414/10; 414/500
[58] Field of Search ............... 414/491, 495, 469, 786,
414/910, 919, 474, 477, 481, 483, 478, 479, 589,
590, 482, 232, 11, 12, 23, 485, 476, 475, 494,
498, 680, 728, 743; 298/10, 12, 14, 22 R, 22 P;
52/115, 116, 118, 119, 122.1, 143, 194, 197;
280/414.5, 426, 442, 443, 774, 674, 109, 91

[56] References Cited

U.S. PATENT DOCUMENTS

| | | |
|---|---|---|
| 1,514,769 | 11/1914 | Johnston et al. . |
| 1,691,020 | 11/1928 | Brinton ............................ 280/91 |
| 1,861,145 | 5/1932 | Sommer ...................... 280/774 X |
| 2,606,676 | 8/1952 | Dempster ...................... 414/469 |
| 2,701,649 | 2/1955 | Hallstrom . |
| 2,726,115 | 12/1955 | Babcock et al. ............... 414/477 X |
| 3,017,719 | 1/1962 | Sigler et al. .................... 414/23 X |
| 3,160,289 | 12/1964 | Leefer . |
| 3,236,398 | 2/1966 | Thiermann . |
| 3,292,320 | 12/1966 | Laharty .................................. 52/119 |
| 3,346,131 | 10/1967 | Lundell ...................... 280/414.5 X |
| 3,687,319 | 8/1972 | Adam et al. .................. 414/498 X |
| 3,866,935 | 2/1975 | Nelson ........................... 414/476 X |
| 3,956,816 | 5/1976 | Short ............................... 414/12 X |
| 3,985,237 | 10/1976 | Freudlsperger . |

4,013,184  3/1977  Lacy .

FOREIGN PATENT DOCUMENTS

| | | | |
|---|---|---|---|
| 809761 | 8/1951 | Fed. Rep. of Germany ...... 414/469 |
| M 18603V | 10/1956 | Fed. Rep. of Germany ........ 414/10 |
| 1136218 | 9/1962 | Fed. Rep. of Germany ...... 414/919 |

Primary Examiner—Frank E. Werner
Attorney, Agent, or Firm—Kinney & Lange

[57] ABSTRACT

A silo mover apparatus comprising a main frame that is movable across the ground on a plurality of support wheels, and which has a subframe pivotally mounted thereon adjacent one end. The subframe can be raised about the pivot to a substantially vertical position through the use of hydraulic cylinders, stabilized in position adjacent to a silo to be moved, clamped to the silo by straps, after the silo has been suitably reinforced, and then the silo can be lifted and tilted downwardly with the subframe to rest on the main frame for transport to a new location. At the new location the silo is then raised by raising the subframe about its pivot, to place the silo onto the desired platform, after which the members that clamp the silo and subframe together are removed. The device is capable of extending to support and lift substantially 90 foot long silos, and the subframe is made into two sections so that it can be extended and retracted in length to shift the supported silo into a desired longitudinal location relative to the main frame. Hydraulic steering is provided for the support wheels on the main frame, so that the wheels can be steered to aid in maneuvering the main frame as it is pulled along the ground.

16 Claims, 15 Drawing Figures

SILO MOVER

BACKGROUND OF THE INVENTION

1. Field of the Invention.

The present invention relates to silo moving machines which will provide a way of lowering, moving and then reraising upright silos.

2. Description of the Prior Art.

In the prior art various transporting devices for handling various structures have been advanced.

U.S. Pat. No. 3,160,289, issued Dec. 8, 1964 to Leefer shows a missile transporter and erector, using a main frame, and a supplemental frame that supports the base of the missile. A pivoting pole arrangement is mounted on the main frame and may be pivoted to raise and lower the missile between horizontal and vertical positions. Support arms are utilized for forming a sling to hold the missiles as the poles are pivoted through the use of a winch.

The support does not provide the features of a full length support for the missile as it is pivoted between its raised and lowered position, for example.

The device does show a leveling feature, as well as rear steering, but does not have the positive control during operation.

U.S. Pat. No. 1,514,769 shows a cradle type structure for moving large rolls of paper. A roll is held on a tilting cradle with the cradle vertical. The cradle is then moved to a position wherein it is tilted back onto a cart until it reaches a horizontal position and is supported on the cart. The cart can then be moved to the desired location.

A prefabricated garage mover is shown in U.S. Pat. No. 3,985,237. This device shows the use of interior braces or supports that keep the corners of the garage braced as it is being moved, and includes caster wheels for supporting the garage once it has been transported to its desired location.

U.S. Pat. No. 2,701,649 shows a "pole jammer" which is a unit that has a pivotally connected mast, which supports a pole horizontally, and then the mast and pole can be pivoted up to an upright position for supporting the pole while it is installed.

Another apparatus for setting poles is shown in U.S. Pat. No. 3,236,398. It has a raising device, but does not use a support cradle. A portable spar pole is shown in U.S. Pat. No. 3,292,320 which has a raising device that has a type of a cradle that slides up along the pole for pivoting the pole into working position.

U.S. Pat. No. 4,013,184 shows a type of a pivoting subframe for a trailer that is used for transporting a container. It is primarily used for garbage hauling, and shows a carriage or support that pivots relative to a main frame.

SUMMARY OF THE INVENTION

The present invention relates to a silo mover for upright silos or similar tall structures, which comprises a main mobile frame that is capable of being moved along the ground, and which has a subframe that is pivotally mounted to the main frame about a generally horizontal axis. Hydraulic cylinders are used for raising and lowering the subframe about its pivot between a generally vertical position and a horizontal position wherein it is resting on the main frame and can be moved along the ground. Means are provided for stabilizing the silo by reinforcing it on the interior, and then clamping it solidly to the subframe so that the silo, when loosened from its base, can be lowered down under control of these hydraulic cylinders without damaging the silo and with reasonable safety.

The main frame can be leveled, raised and lowered, and also the rear portions of the frame can be steered. The frame is adapted to be towed by a semitrailer tractor, and its steering can be controlled by manual valves or automatically if desired.

Suitable stablizer feet or legs are provided for stabilizing the frame when the silo is being moved.

Because of the ability to closely control the subframe, and the ability to raise and lower the subframe while supporting a silo, the silo can be placed onto a foundation or removed from a foundation for moving quite easily.

In the process of moving, the silo that is already assembled on a support pad or floor is loosened from its support pad or foundation, and interior braces are placed on the interior of the silo, the braces, as shown, comprise spiders which will prevent the silo from flattening or becoming egg shaped. The silo mover is moved up next to the silo, and the subframe is raised so that it is adjacent to the silo. The subframe has curved cross members that follow the outer contour of the silo, and has pads such as pads of styrofoam, that run longitudinally along the subframe and will engage the silo on its vertical length.

The interior braces are put into place within the silo. Then suitable straps are used for fastening or clamping the silo to the subframe at desired locations, after which the silo is lowered by lowering the subframe about its pivot to its horizontal position. Once the silo is resting on the main frame, the silo can be transported to the desired location. When the desired location is reached it is raised by raising the subframe, and then the silo base is fastened down onto its new foundation, the straps are removed, and the interior supports are also removed.

The subframe, as stated, can also be extended and retracted along its longitudinal length to accommodate different heights of silos, and also to move the silo so that it is centered over the rear support wheels of the main frame, in the case of very tall silos, after the subframe has been lowered.

The device is easily used for reducing the costs of moving silos from one place to another as farm needs change.

DETAILED DESCRIPTION OF THE PREFERRED EMBODIMENTS

Figure 3:
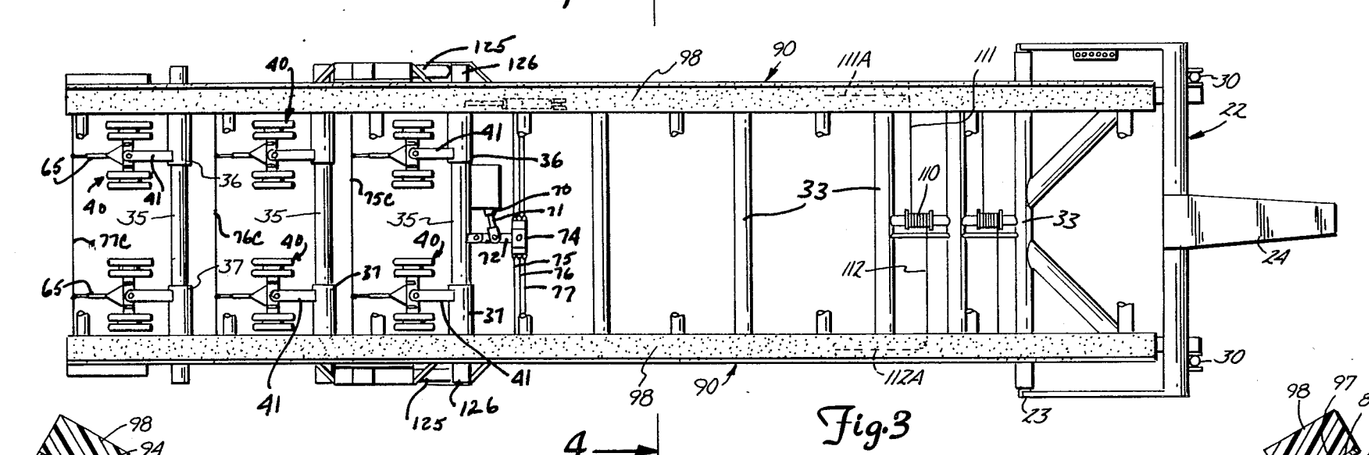
FIG. 3 is a top plan view of the silo mover shown in FIGS. 1 and 2.
Figure 4:
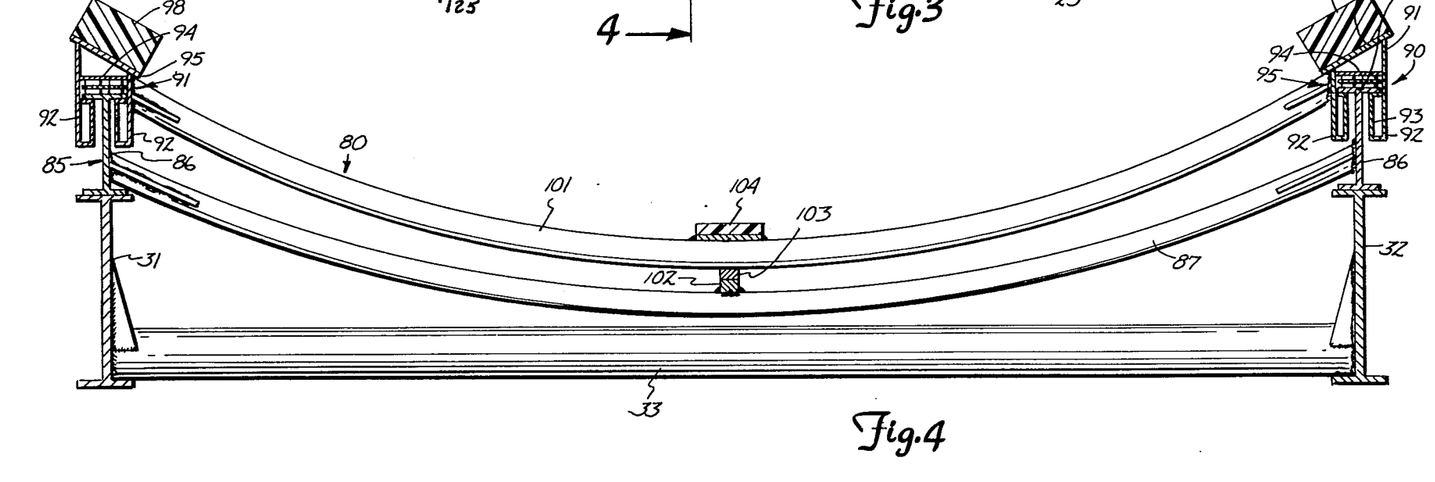
FIG. 4 is a sectional view taken as on line 4—4 in FIG. 3.
Figure 5:
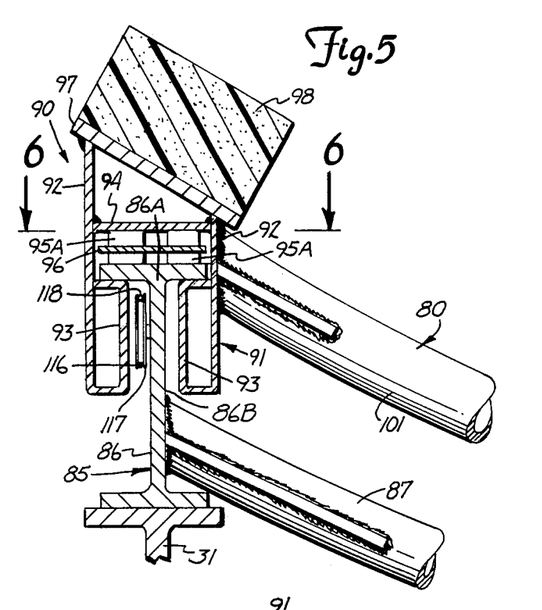
FIG. 5 is a vertical sectional view showing a detail of the two part subframe made according to the present invention.
Figure 6:
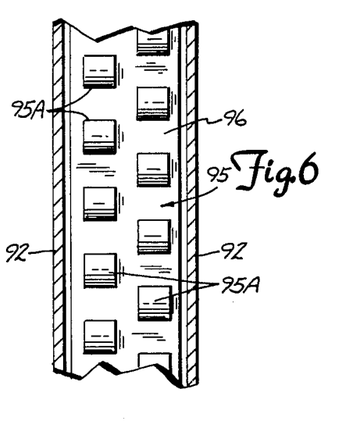
FIG. 6 is a fragmentary sectional view taken as on line 6—6 in FIG. 5.

The silo mover assembly illustrated generally at 20 comprises a semitrailer that has a main frame 21, and a forward support frame 22, that is pivoted to the main frame 21 as at 23, and includes a gooseneck 24 that can be supported onto the frame 15 of a semitrailer tractor (truck) 26. The pivot 23 and the forward frame 22 are similar to that of a conventional earth mover, and are controlled through the use of a double acting hydrulic cylinder 30 to be raised and lowered to permit fore and aft leveling of the main frame 21. The main frame 21 in turn, as shown in FIG. 3, and FIG. 4, has fore and aft extending side frame members 31 and 32, respectively, which are held together with a plurality of cross members 33.

Thus the front portion of the main frame 21 is held in position and can be supported on a semitrailer tractor 26 for movement.

Additionally, the rear portions of the main frame 21 have cross members indicated at 35 thereon, which comprise rear support wheel mounting cross members. As shown, there are three such cross members 35, and at the opposite ends of each of the cross members, that is adjacent the longitudinally extending side frame members 31 and 32, there is a separate pivoting sleeve 36 mounted adjacent one side of the machine, and 37 mounted adjacent the other side of the machine. Thus there are six pivot support sleeves or tubes 36 and 37 for supporting wheel assemblies indicated generally at 40 adjacent the sides of the machine. The wheel assemblies are mirror images of each other, and each wheel assembly 40 is supported to its respective tube 36 or 37 through a support arm indicated generally at 41. The arms 41 are fixed to their respective tubes 36, and 37, and thus when the tubes 36 and 37 are in place the wheel assemblies 40 will be held relative to these pivot tubes 36 and 37.

Figure 9:
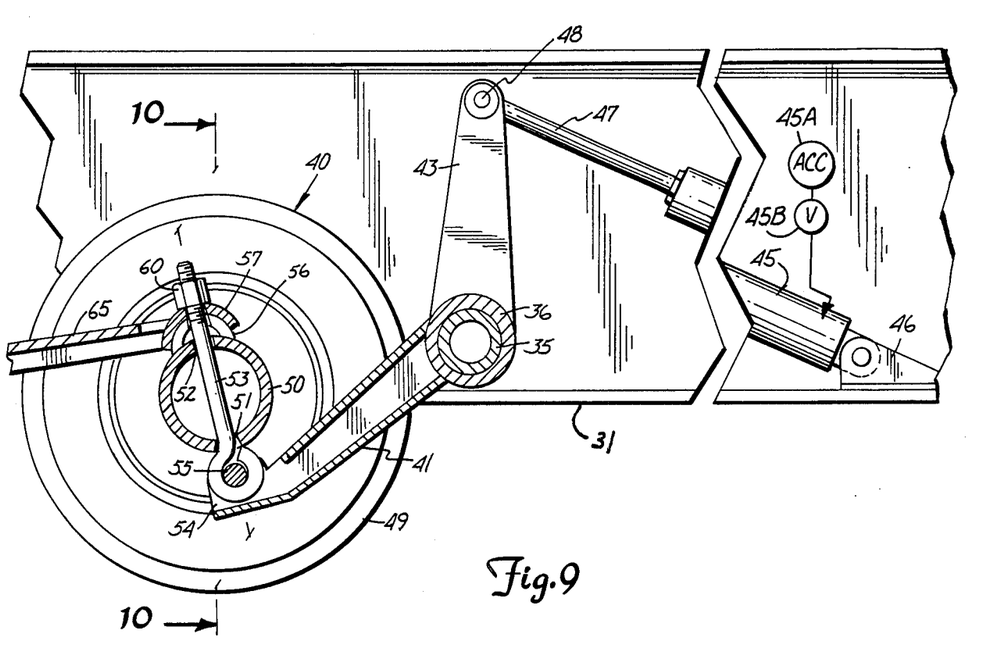
FIG. 9 is a fragmentary sectional view showing a typical support axle used with the main frame of the present invention.

The rotational position of the tubes or sleeves 36 and 37 relative to the cross members 35, and thus the height of the main frame, will be controlled by a control arm 43, one of which is welded to each of the tubes 36 and 37. The arms 43 are positioned between the flanges of the respective I beam side members 31 and 32. As shown in FIG. 9, each arm 43 is controlled in its rotational position with a separate hydraulic cylinder assembly 45.

Each hydraulic cylinder assembly 45 has its base end connected to a support 46 welded to the lower flange of the respective longitudinally extending side frame member, which is formed as an I beam. The cylinder assembly 45 has an internal piston that controls an extendable and retractable rod 47 which in turn is pivotally mounted as at 48 to the outer end of the respective arm 43.

As will be explained, each of the arms 41 supports one of the wheel assemblies 40, and thus by extending and retracting the cylinder rod 47 through the use of a suitable valve (cylinders 45 are double acting cylinders) the control of the height of that wheel assembly 40 connected to the respective rod 47 is achieved.

It should be noted that the cylinders 45 on each side of the frame (there are three of them, one for each of the wheel assemblies on each side of the frame) are connected in parallel so that the load on the cylinders on the same side is equalized. The cylinder assemblies 45 on the opposite side of the frame can be independently controlled from a separate valve so that the frame assembly can be leveled from side to side by controlling the position of the cylinder assemblies 45 on opposite sides of the main frame. In use the base ends of the cylinder are coupled to an accumulator 45A through a valve 45B that can be opened for transit but closed to hold the machine stable when raising or lowering a silo.

Figure 10:
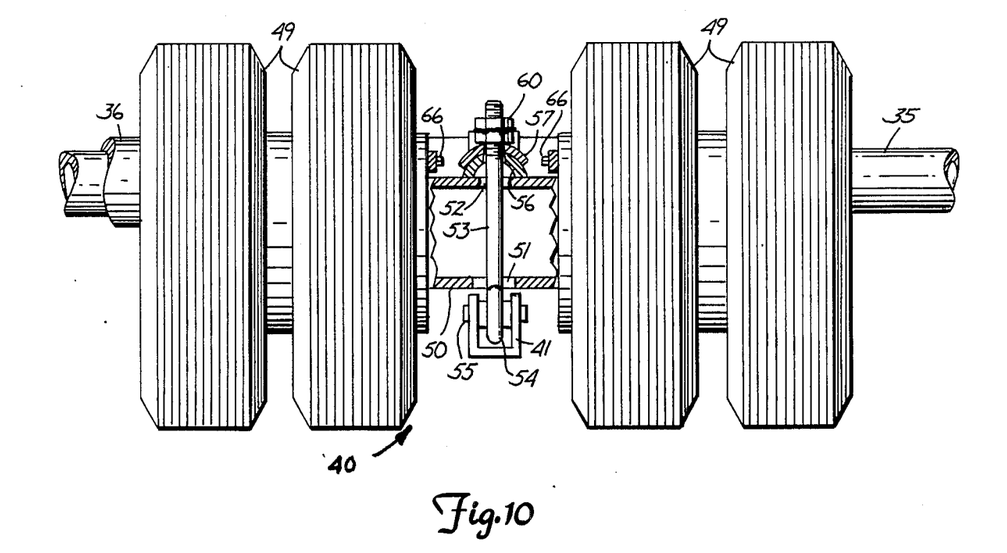
FIG. 10 is a sectional view taken as on line 10—10 in FIG. 9.

As shown in FIGS. 9 and 10, each of the wheel support assemblies 40 can be conventionally made, and the individual wheels 49 (there are four wheels and tires on each assembly) are mounted onto a suitable axle with bearings in a conventional manner, and include internal brake drums. These wheels are commercially available. The inner most wheels 49 are connected to an axle tube 50 that makes the individual wheel assemblies and axles capable of being steered in the present structure. The tubular axle 50, as shown, has an opening or slot 51 at its lower side, and another opening 52 at its upper side (see FIG. 10), and a large eye bolt 53 is passed through these openings. The eye portion 54 of the eye bolt 53 is connected with a pin 55 to the arm 41, at the outer end of each of the arms 41.

On the upper side of the axle 50 there is a part spherical washer or support shown at 56, and this spherical support is fixed to the tube or axle 50. An outer spherical washer that mates with the support 56, and which is shown at 57 is placed over the support 56. The outer end of the eye bolt is then fastened in place with a pair of nuts 60, which can be locked in place. The weight of the machine acting through the tires forming the wheel assembly 40, and the axle tube 50 causes a bearing load to be exerted upwardly against the upper washer 57, and thus through the nut 60 to the eye bolt 53 and then to the pin or axle 55. This then carries the load through the arm 40 to the sleeves or tubes 36 or 37, depending on which side of the machine one is looking at, and then back through the respective arm 43 to the respective cylinder assembly 45.

The spherical seat member 56 and washer 57 permit the axle 50 to tilt from side to side for accommodating irregularities in the ground. This can be seen in FIG. 10, for example. At the same time the axle is permitted to be pivoted about the axis of the eye bolt 53. This is how the wheel assemblies are steered, that is, by controlling movement about the axis of the eye bolt.

It should be noted that each set of three cylinders 45 for the three wheel assemblies on each side are in parallel, and that by raising and lowering the cylinders 45 on one side of the frame, all of the cylinders will share load, causing the arms 41 to pivot substantially equally, to cause the frame on that side to be raised and lowered relative to the opposite side.

Then, the cylinders 45 that control pivoting of the sleeves 37 and movement of the wheels on the opposite side of the frame can also be operated to either level the frame, or to maintain it at any desired height.

The steering of the wheel assemblies is accomplished by controlling the steered position of the axle tubes 50 about the axis of the shank of the eye bolt 53. As shown, there are steering arms 65 fixed with respect to the tubes 50, through generally horizontal axis pivot pins indicated at 66 in FIG. 10, and this will permit the arms 41 to move up and down, while the steering arms 65 are also permitted to move relative to the tubes without binding.

Figure 14:
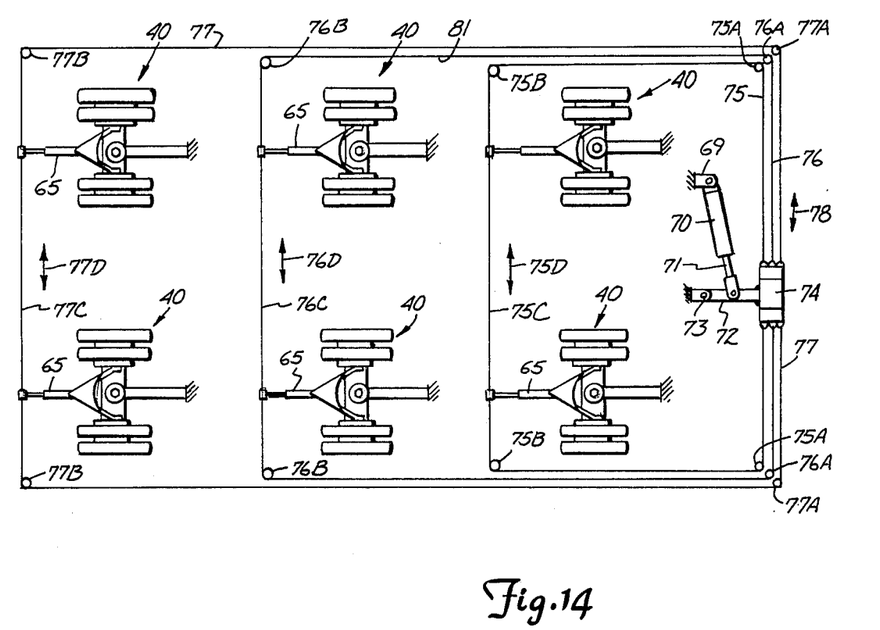
FIG. 14 is a fragmentary schematic view of the steering mechanisms used with the device of the present invention.

The steering arms 65 are controlled by cable and pulleys, operated with a hydraulic cylinder for steering. As shown in FIG. 14, and also in FIG. 3, each of the steering arms 65 is connected to a cable that is moved by operation of a hydraulic actuator indicated generally at 70. The actuator 70 is a double acting cylinder having its base connected through a bracket 69 to the main frame (one of the cross members 35) and actuator 70 has an extendable and retractable rod 71 that is operated by a double acting piston on the interior of the cylinder of the actuator to control a steering arm 72 that has one end pivoted as at 73 to the frame, and the other end of which carries a cable control member 74.

The wheel assemblies 40 on each of the respective cross members 35 is connected for simultaneous movement, through a separate cable assembly. All of the cables controlling the steering arms on all three cross members move whenever the control member 74 moves. For example, there is a cable 75 which is connected over pulleys or sheaves with the member 74, on the opposite sides of the frame, and then the cables will pass back along the longitudinal side frame members to other pulleys 75B, as shown, so that the cable 75 can extend with a length shown at 75C transversely across the frame. In this instance, a steering arm 65 from the front most pair of steering wheel assemblies or sets 40 is fixed to the cable length 75C, and as can be seen when the cable length 75C is moved in either direction as indicated by the double arrow 75D, the connected arms 65 and the wheel assemblies 40 connected thereto will also be moved about the pivot of the eye bolt supporting those wheels.

A second cable 76 is connected to the cable control member 74 and passed over pulleys 76A at opposite sides of the frame, and transversely aligned. The cable 76 extends back rearwardly toward the second or center sets of wheels 40. Pulleys 76B are provided on the side frame members, respectively, to permit a length of cable 76C to extend laterally across the frame behind the center sets of wheels 40. The cable length 76C is connected to steering arms 65 on the center sets of wheels 40, and as the cable length 76C is moved as indicated by the double arrow 76D, the sets of wheels 40 having their arms connected to the cable length 76C will be steered.

A third cable 77 is provided, and connected to the cable control members 74. Suitable pulleys 77A are provided on the side frame members for guiding the cable laterally from the member 74 so that lengths of the cable 77 will pass rearwardly along the side frame members. The length of cable 77 is passed over pulleys 77B, and then the cable forms a length 77C that extends laterally behind the rear most sets of wheels 40. The cable length 77D is connected to the arms 65 on the rear most sets of wheels 40. Whenever the cable control member 74 is moved in direction as indicated by the arrow 78, the cable length 77C will move as indicated by the arrow 77D, and this will cause the rear most sets of wheels to also turn or pivot about the shank of the respective eye bolts supporting them.

Thus, by operating the double acting cylinder 70, and moving the control member 74 laterally back and forth, the sets of wheels 40 on both sides of the frame are simultaneously moved for steering purposes. The cylinder 70 can be controlled in any desired manner with a valve, for positioning of the frame precisely by an operator on the frame, or it can be controlled through a steering valve on a tow vehicle that is pulling the machine if desired.

As shown schematically, therefore, it can be seen that each of the sets of wheels 40 is capable of accommodating irregularities of the ground and also is capable of steering through the use of the eye bolt support and the spherical washer assemblies at the upper side of the cross tubes 50.

Figures 1, 15:
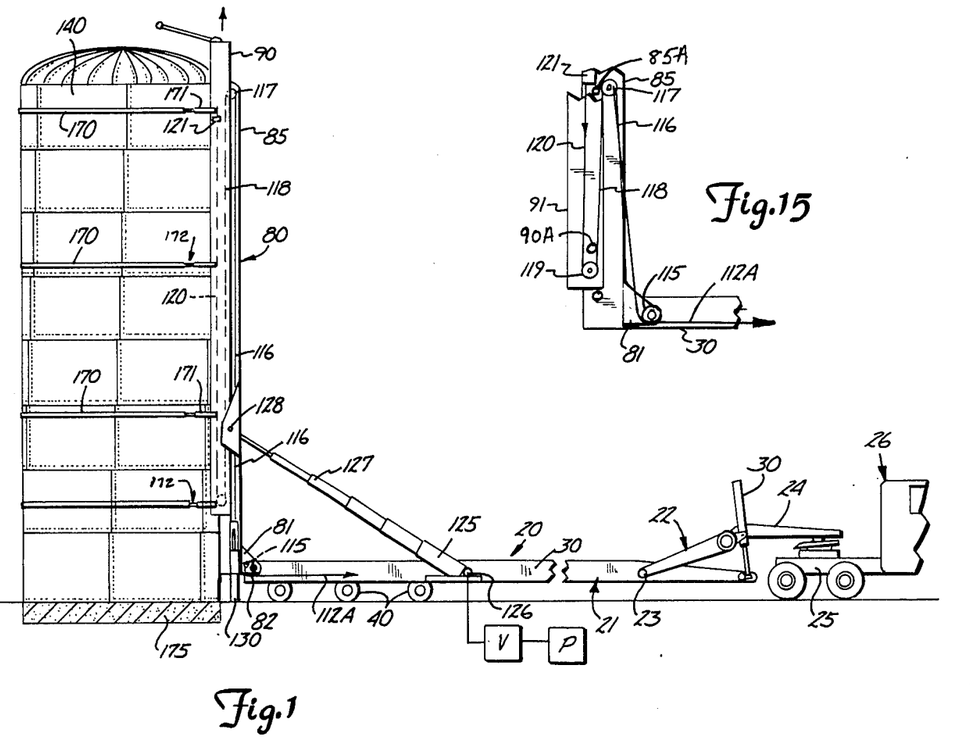
FIG. 1 is a side elevational view of a silo mover made according to the present invention shown in position adjacent a silo to be moved.
FIG. 15 is a schematic representation of cable reeving used for adjusting the position of a subframe that supports a silo to be moved.
Figure 2:
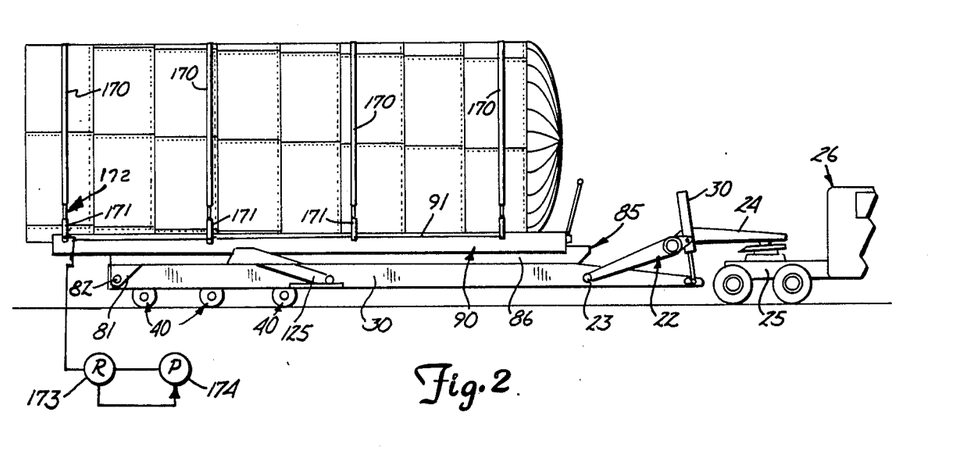
FIG. 2 is a side elevational view with the silo in a lowered position so that it is supported on a main frame of the silo mover of the present invention.
Figure 7:
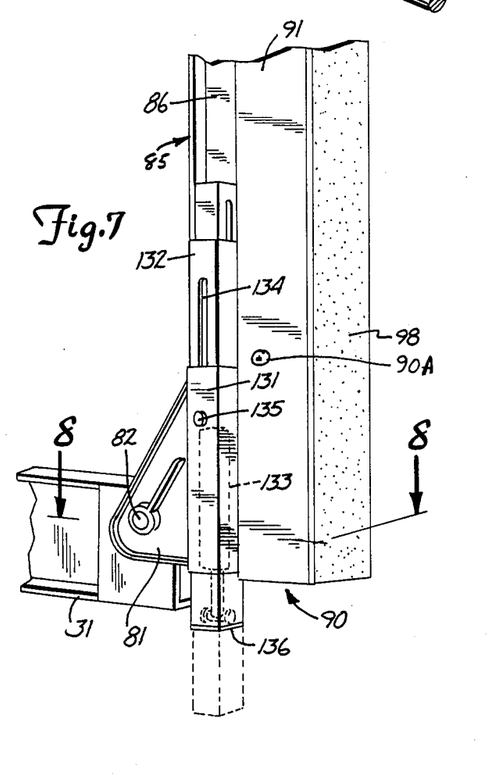
FIG. 7 is a fragmentary perspective view of a pivot assembly and support pad for the subframe at the rear of the main frame.
Figure 8:
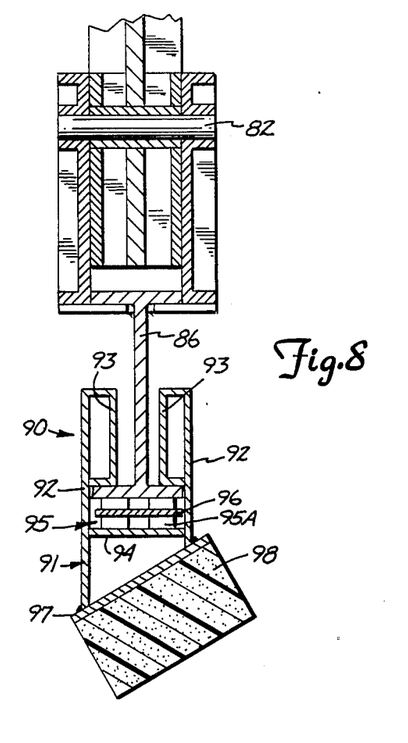
FIG. 8 is a sectional view taken as on line 8—8 in FIG. 7.

The subframe for supporting a silo is illustrated generally at 80 in FIG. 1, where it can perhaps be seen the best in use, and it is made so that it has large pivot brackets 81 at the rear end thereof, and pins 82 pivotally mount this subframe to the main frame (see FIG. 7 also). The subframe 80 is made up of two separate sections, one of which can be telescoped relative to the other. By way of detail, in FIG. 4, the subframe 80 has a first section 85 that is the one that is next to the upper side of the main frame 20 when the subframe is in its lowered position as shown in FIGS. 2 and 4. The first or base section 85 has longitudinal side members 86, which have the pivot brackets 81 fixed thereto. Thus the longitudinal side members 86 cannot move longitudinally relative to the main frame but do pivot.

Curved transverse cross members indicated at 87 join the side frame members 86,86 of the subframe and these cross members 87 are spaced at desired intervals along the length of the subframe. As can be seen the cross members are curved at a sufficient radius so that they will not interfere with or engage the wall of a silo to be moved when the subframe 80 is adjacent to the silo.

The first subframe section 85 extends for a desired length along the main frame 20, and when the subframe assembly is lowered, the two frames will overlie each other substantially, generally as shown in FIG. 2.

The second subframe section 90 has a pair of longitudinally extending side frame members 91, each are made with side skirts 92,92 which pass down along side the upper flange 86A of the side members 86 of the first subframe section 85. The skirts 92 have turned in lips or flanges 93 that are underneath the edges of flange 86A.

The side skirt members 92 thus prevent the second subframe section from lifting up from the first subframe section 85, but permit the second section to slide longitudinally therealong, because there is a space between the skirt members 92 and the vertical web 86B of the longitudinal subframe members 86.

The skirt members 92 are joined by a longitudinal cross plate member 94 at the upper side thereof. The cross plate 94 is supported on a roller track assembly 95. The rollers 95A in the roller track act like a roller bearing, but the rollers 95A are held into a type of a bearing race 96 or retainer so that the rollers 95A cannot fall out from position between the top surface of the flange 86A and the cross plate 94. The rollers 95A will roll to permit longitudinal movement of the second subframe section along the side frame members 86. Additionally, an inclined support plate 97 is connected to the upper edges of side skirt members 92, and plate 97 is inclined at approximately the angle of the tangent to the circle defined by the cross section of the silo being lifted. A support block 98 is fixed to the top of these plates 97. Support block 98 of suitable material, such as a high density foam, for frictionally and resiliently engaging the surfaces of the silo being moved to prevent damaging the silo surfaces when the silo is being held in place on the subframe. For smaller diameter silos additional foam blocks can be added to blocks 98 for adjustment to accommodate different diameter silos.

The second or longitudinally movable section 90 of the subframe has cross members 101 thereon which join the side members 91, and the cross members 101 are curved to substantially the same radius as the cross members 87, and actually lie over the cross members 87 when the subframe is in its retracted position as shown in FIGS. 2 and 3.

As shown in FIG. 4, a longitudinally extending bearing rail 102 is mounted on the top of the cross members 87 in the center portions thereof, and a mating rail 103 is mounted on the lower side of the cross members 101, so that the two sets of cross members will be maintained separated as the subframe sections are moved longitudinally relative to each other. Additionally, a support strip shown generally at 104 is provided in the center of the cross members 101 and is covered with a resilient material such as foam for contacting and supporting a silo in the center portion of the movable subframe section 90.

The movement of the two subframe sections 86 and 90 relative to each other can be controlled in any desired manner, but in the present device they are controlled through the use of cable assemblies that are operated from a winch 110 which are shown in FIG. 3. Winch 110 can be used to drive cable sections 111, and 112 (separate cable sections but one cable). The cables 112 and 111 are operated continuously by the single winch 110, and as shown they will pass over pulleys 113 and extend in lengths 112A and 111A back toward the rear of the main frame 21.

The reaving of the cable for moving the second subframe section is conventional, but is shown schematically in FIGS. 1 and 15. The cable length 112A is shown but each cable on each side is identically reaved. Each cable passes over a pulley indicated at location 115, located on the same axis as pivot pin 82 on the respective longitudinal side member 86 of the first or base subframe section 85. Each cable then passes upwardly in a length indicated schematically at 116, up to a separate pulley 117 also rotatably mounted on the respective side member 86. Each cable then passes back down on the inside of the respective skirt 91 of the subframe section 90, as shown schematically at 118 (see FIG. 4 also), and then each cable passes over another separate pulley shown at 119 that is mounted on the respective side member of the subframe section 90. Each cable then goes back toward the forward or upper end of the subframe in a length 120 and is anchored at a position shown at 121 on the respective side members 86 of the first subframe section 85. Thus, as the cable 112 for example is pulled, in direction as indicated by the arrow in FIGS. 1 and 15, tension will be created on the length 116, and this will be passed over the pulley 117, so that there will be an upward force on the length 118, and this upward force will be transferred over the pulley 119, which is rotatably mounted on the second, movable subframe section 90. The length 120 is dead ended as at 121 with respect to the frame section 85 to provide the reaction for force to move the subframe section 90 upwardly, or longitudinally away from the pivot pin 82 when the cable 112 is put under tension. The same would happen with cable 111, which will be under tension at the same time.

A locking pin 90A is located on each side of the subframe to lock the two subframe sections together. A series of holes 85A (see FIG. 15) are provides in the subframe section 85 along the length and pins 90A will fit into an aligning hole 85A. This takes the load off the cables during use of the subframe. The pins 90A are used to lock the subframes together during road transport also.

The cables will only create tension load, of course, and when the pins 90A are removed, and the subframe section 90 is to go rearwardly again or retract, the base section 85 of the subframe has to be inclined slightly so that there is a gravitational force tending to slide the movable section 90 rearwardly-downwardly relative to the subframe section 85.

The bearing rollers 95A and retainers 96 of bearing assemblies 95 between the subframe section 90 and the subframe section 85 are free to move as the two subframe sections move relative to each other, and the rollers 95A reduce the friction between the two sliding parts. The bearing assembly 95 will move one-half of the distance of the relative movement between the two subframe sections as it rolls.

The pivoting of the subframe assembly 80 about the pivot pin 82 from its lowered position to its raised position, as shown in FIGS. 1 and 2, is done with a multi stage large hydraulic cylinder 125 on each side of the machine. The cylinder 125 is a multi-stage cylinder that has a great deal of extension relative to its collapsed length, and includes a base section that is mounted as at 126 to each of the side frame members 30 and 31 forming the main frame, and the extendable rod sections indicated generally at 127 are connected at the outer end to a suitable bracket 128 on each side of the base or first subframe section 85 of the subframe assembly 80.

A suitable valve and pump are used for supplying hydraulic pressure to the cylinder assembly 125, and upon extension of the cylinder assembly, from its collapsed position shown in FIG. 2, the subframe assembly 80 will be pivoted about the pin 82 to its upright position.

Once the unit is in this position, it can be supported relatively stable by using extending and retracting outrigger support members indicated at 130. These support members are shown perhaps best in FIG. 7, and comprise an outer housing or tube 131 that is attached to each of the longitudinal extending side members 86, adjacent the rear parts thereof. On the interior of housing 131 a telescoping member 132 is mounted, and the extension and retraction of the member 132 is controlled with a hydraulic cylinder assembly shown in dotted lines at 133 on the interior of the assembly. A suitable slot 134 is provided for clearance of the base end support pin 135 for the cylinder, and upon extending and retracting this cylinder 135, the lower end of the tube 132, comprising a support foot 136 will contact the ground and can be used for supporting the entire frame assembly when the unit is in its raised position as shown in FIG. 1. This will take the loads off the cylinders that support the wheel assemblies 40, and provide a very stable support. Also, at this time, the winch 110 can be operated to move the cables 112 and 111, and through the pulleys 117 and 119 tend to raise the movable subframe section 90 to the desired level. As shown in FIG. 1, the subframe has been raised above the normal tangent position so that the outer end, shown at the top in FIG. 1, is out beyond the outer end of the base or first subframes section 85.

Figure 11:
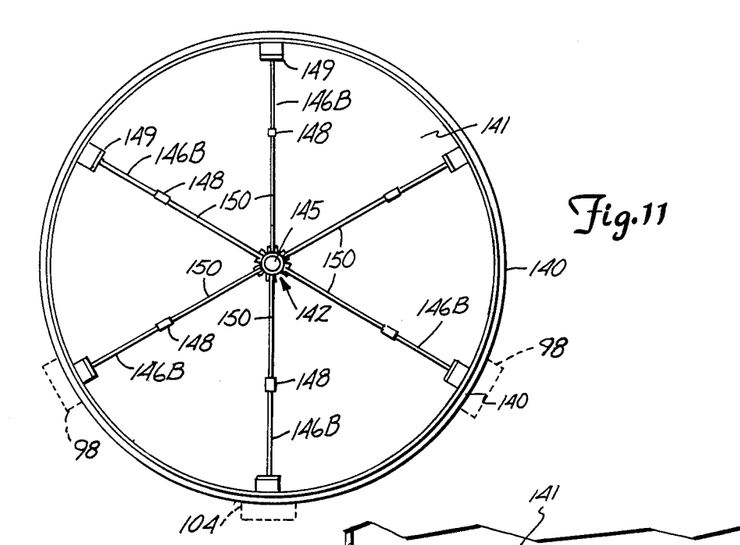
FIG. 11 is a top plan view of a typical silo showing an identical support mechanism for supporting the walls of the silo against collapse during the moving operation.
Figure 12:
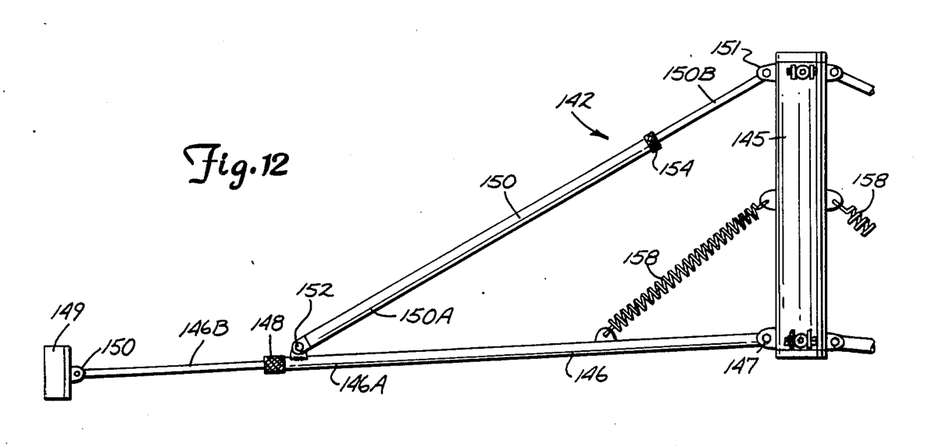
FIG. 12 is a fragmentary side view of a portion of the support shown in FIG. 11.
Figure 13:
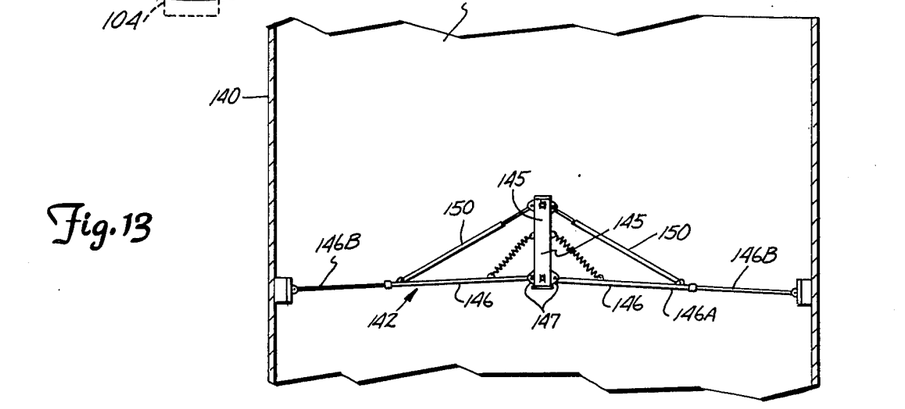
FIG. 13 is a sectional view showing the support of FIG. 11 in place in the interior of a silo.

Once the subframe sections have been positioned properly, including having the section 90 raised to its desired level, and the main frame is adjacent to the silo 140 as shown in FIG. 1, the wall of the silo 140 is braced from the interior with braces such as those shown in FIGS. 11, 12 and 13. The silo 140 as shown is cylindrical and has an outer wall that defines an interior chamber indicated at 141. In the form shown, a plurality of spiders indicated generally at 142 are provided for preventing the silo from becoming egg shaped when it is clamped onto the subframe assembly of the silo mover. In the form shown, as perhaps best seen in FIGS. 12 and 13, the spiders 142 are made up of a central upright tube indicated generally at 145, which has generally radially extending lower legs 146 pivotally mounted as at 147 to the lower end thereof. The legs 146 are made in two sections 146A and 146B which telescope and which are adjustable to adjust the length of the legs through a suitable length adjustment clamp assembly 148. Set screws or cross pins also could be used for adjustment. The outer end of each leg 146 has a pad 149 pivotally mounted thereto about a pivot 150, so that they tend to be self leveling. The pad 149 can be of a material that has relatively high frictional properties such as a suitable synthetic foam, such as polystyrene foam.

Diagonal braces indicated at 150 are provided between the upper end of the center tube 145, and are pivoted thereto as at 151, and these diagonal braces also can be made in two telescoping sections 150A and 150B. The outer or base section 150A pivoted as 152 to a midportion of each of the legs 146. As shown, there are five of the legs 146 positioned around the tube 145, although there may be more, and suitable braces of a different kind can be made as well. The base section 150A of the brace 150 is tubular and the telescoping section 150B will telescope into the upper end of base section 150A, and can be held with a suitable stop collar 154 fixed to section 150B and which abuts on the end of section 150A. The member 150B can thus extend so that the arm 146 can move downwardly about its pivot 147. A spring 158 is provided between the center tube 145 and each of the legs 146 to tend to urge them to their radial position. The spiders 142 are placed into the lower part of the silo, with the arms 146 pivoted downwardly so that the diameter defined by the support pads 149 is less than that of the interior diameter of the silo 140. When the center tubes 145 are pulled upwardly in the silo, the legs 146 tend to fold in toward the center axis.

As this happens of course, the pads 149 then tend to define a smaller diameter, and the spider can easily be pulled upwardly into the silo to a desired level. The spring 158 will tend to hold the arms 146 out against the silo wall, but the upward movement will insure that any friction that is caused between the pads 149 and the silo wall will tend to fold the arms so that the spiders will not jam in place.

Each spider is assembled on the floor of the silo and then raised up into position. When each of the spiders is positioned vertically along the silo wall at a desired level, it can be permitted to drop so that the center tube 145 tends to move downwardly, tending to spread the pads 149 outwardly, as helped by the springs 158. By selecting the position of stops 154 to stop and hold the telescoping member 150B of each brace in a desired position the pads 149 will be held when all pads 149 tightly engage the silo wall as shown in FIG. 11 to support the wall of the silo from tending to become egg shaped or flatten out when fastening bands are placed on the outside of the silo. The next spider is then assembled and raised into position. To hold the silo 140 to the subframe assembly in particular to the section 90, as shown in FIG. 1, a plurality of web type straps indicated generally at 170 are placed around the silo 140, and are fastened to the side members of the subframe section 90, with suitable tighteners indicated generally at 172 on each side. One end of the web straps 170 can be fastened by clamping or bolting to one of the longitudinal side frame members of the subframe section 90, and then for example a ratchet type tightener used commonly for initial tightening down covers on semitrailers can be used for tightening the other ends of the web straps 170 to force the silo to rest against the longitudinal pads 98 of the subframe section 90 and thus clamp the silo in position. After initial tightening, hydraulic cylinders indicated at 171 can be actuated and used to maintain a constant force on the straps by using a sensor and regulator 173 which maintain the pressure by actuating a pump 174 to rebuild the pressure if one strap stretches or loosens. The cylinders 171 are connected in parallel so pressure is maintained.

Three of the legs 146 and pads 149 directly align with the supports 98 and 104 to support the wall of the silo where the subframe contacts the silo and brace the wall directly back to the opposite side through the diametrically aligning leg 146. Once the desired number of web straps 170 have been tightly secured, (as shown, there are four of them), the silo is ready to be released from its base.

The silo will be unfastened from its concrete pad 175, at the base end, and once this is done, the cylinders 133 for the stabilizer feet and the cylinder 45 for wheel assemblies 40, all can be actuated to lift the silo 140 right off the surface of the ground. The cylinders for operating the wheel assemblies 40 can be operated as previously described to lift the entire frame up to provide clearance at the bottom of the silo.

When this is done, the subframe pivot cylinders 125 are permitted to retract. The cylinders 125 can be single acting or double acting. In order to retract the cylinders 125, if they are single acting, a suitable cable from a separate winch can be utilized for tending to pull the subframe 80 about its pivot back toward the main frame at the same time that fluid is let out by the control valve assembly for the cylinders 125 to let fluid bleed out at a desired, gradual rate.

The silo 140 then is lowered carefully, as the subframe pivots, and when the subframe has moved to an angle of in the range of 15°–20° with respect to the horizontal, pins 90A can be removed and winch 110 can be operated to release the tension on the cables 111 and 112 and permit the subframe section 90 to slide back toward the base or pivot pin 82 to locate the silo at its desired point relative to the wheel assemblies and the main frame.

As shown in FIG. 2, the silo has been permitted to move rearwardly so that the forward end of the subframe section 85 is extending out beyond the end of the movable subframe section 90 when the subframe has moved all the way to its horizontal transport position supported on the main frame.

Once the subframe and connected silo is in its position as shown in FIG. 2, the wheel assemblies 40 can be operated for lowering the frame to its desired position for transport, along with the use of the cylinders 30 regulating the forward support 22. Then the silo can be transported. The stabilizer 130 will be retracted also.

When the silo reaches the desired location, the subframe can be raised by operating the cylinders 125 to pivot the subframe to a desired angle. The subframe section 90 can be extended relative to subframe section 85 by operating the cables 111 and 112, if needed, and then the entire subframe is raised so that the silo 140 is standing upright on its desired location as shown in FIG. 1. The silo is located onto its support pad and fastened in place, and then the straps 170 are released. After that, the frame 21 can be moved away from the silo slightly, the subframe lowered, (retracting section 90 if necessary) and the mover is ready to go again.

The internal spiders or braces for holding the silo wall in proper configuration are removed, of course, and the silo will be available for use.

Thus, the silo does not have to be completely disassembled to be moved, reducing costs, and increasing the speed of movement.

Although the present invention has been described with reference to preferred embodiments, workers skilled in the art will recognize that changes may be made in form and detail without departing from the spirit and scope of the invention.

What is claimed is:

1. A machine for moving elongated cylindrical objects, such as farm silos, comprising:

a main frame having longitudinal main frame side members having a first length, and having front and rear ends and wheel means;

a subframe pivotally mounted on said main frame adjacent the rear end of the main frame, the subframe comprising a first subframe section having longitudinally extending first subframe side members which are pivotally connected to the rear ends, lie above and extend along the main frame side members, respectively, the first subframe side members each having an I-beam comprising a lower flange connected by a web to an upper flange and extending for substantially the entire length of the first subframe side members, and having first and second ends, and a second subframe section having second subframe side members slidably mounted on the upper flanges of the first subframe side members for slidably moving along the first subframe side members and being substantially the same length as the first subframe side members, and the second subframe being selectively moveable to positions extending beyond each of the first and second ends of the first subframe side members, the second subframe side members having substantially continuous outwardly facing surfaces, facing generally in direction away from the first subframe side members;

hydraulic cylinder means for raising and lowering said subframe about the pivotal mounting to the main frame from a first position wherein the first subframe side members are resting on the main frame side members to a second position wherein the subframe is substantially vertical, the upper flanges on the first subframe side member being substantially horizontal with the subframe in its first position and the lower flanges being offset from the pivotal mounting;

means to clamp a cylindrical object to be moved against the outwardly facing surfaces of said second subframe side members; and means for slidably moving said second subframe section relative to the first subframe section so that the first and second subframe side members are substantially in registry with each other to a position wherein an outer end of the second subframe section extends outwardly from the first end of the first subframe section in an upward direction when the subframe is substantially vertical, and to permit moving the second subframe section and a supported cylindrical object to position an end of the second subframe section side members opposite from the outer end to extend outwardly from the second ends of the first subframe side members with the subframe in its lowered position to thereby place a supported cylindrical object in position overlying the pivot between the main frame and the first subframe section and to move a base of the supported cylindrical object rearwardly relative to the main frame.

2. The apparatus as specified in claim 1 wherein said wheel means includes means for raising and lowering said wheel means relative to the main frame.

3. The apparatus as specified in claim 1 wherein said wheel means include wheel assemblies on opposite sides of said main frame, said wheel assemblies on the opposite sides of said main frame being capable of being raised and lowered relative to each other for frame leveling purposes.

4. The apparatus as specified in claim 3 wherein said wheel means include steering portions, and hydraulic cylinder means for moving said steering portions to steer said wheel means.

5. The apparatus of claim 1 wherein the first subframe section is pivoted to the rear end of the main frame, and the second subframe section has skirt members on opposite sides of said horizontal support flange, overlapping the first subframe side members in vertical direction, said skirt members including inwardly turned second flanges that fit under the horizontal flange to prevent the first and second sections from separating.

6. The apparatus of claim 1 wherein the surfaces on the side members are tilted to substantially form tangent planes when the cylindrical object to be moved contacts the surfaces.

7. The apparatus of claim 6 wherein the means to clamp the cylindrical object against the surfaces on the subframe comprises strap members extending around the outer surfaces of the object, and means to support the wall of the object from the interior of the object.

8. The apparatus as specified in claim 7 wherein said cylindrical object has a central axis and an inner surface, and wherein the means to support the interior of the cylindrical object to be moved comprises a spider member having a central support housing, positioned along the central axis of the object, a plurality of arms extending radially outward from said central support housing, said arms being pivotally mounted to said central support housing on axes perpendicular to the central axis, and brace means to hold said radially extending arms relative to said central support housing at a desired position, the radially extending arms having means at the outer ends thereof to engage the inner surface of a cylindrical object to be moved, and being of length so that they will tighten to bear against the inner surface of the cylindrical object as the central support housing moves downwardly in the cylindrical object.

9. The apparatus as specified in claim 8 and spring means acting between the radial arms and the central support housing to tend to move the radial arms in an upward direction when oriented in a cylindrical object to be moved that is standing vertically.

10. The apparatus as specified in claim 8 wherein said brace means are adjustable in length.

11. A machine for moving elongated cylindrical objects, such as farm silos, comprising a main frame having longitudinally extending side members with front and rear ends, wheel means to support said main frame, a subframe pivotally mounted on said main frame adjacent the rear end of the main frame, means to raise and lower said subframe about the pivotal mounting from a position wherein the subframe is substantially vertical with the main frame adjacent the ground to a position wherein the subframe is resting on the main frame in a substantially horizontal lowered position, means to clamp a cylindrical object to be moved against surfaces of said subframe in its raised position, to move the object with such subframe between the vertical and lowered positions, said subframe having first and second subframe sections that telescopically move relative to each other, means for slidably moving said first and second subframe sections relative to each other from a superimposed position to a position where a portion of one of the subframe sections extends beyond the other section in an upward direction when the subframe is substantially vertical, and also in rearward direction when the subframe is in lowered position, a plurality of cross members extending between the longitudinal main side frame members, said cross members being spaced in longitudinal direction and positioned adjacennt the rear of the main frame, said wheel means including a plurality of wheel assemblies arranged in pairs, and each pair being supported on one cross member, each pair comprising a separate wheel assembly adjacent each of the longitudinally extending side frame members of the main frame, said wheel assemblies each including an arm extending rearwardly from and pivotally mounted on the respective cross member for movement about a generally horizontal axis, and a wheel support and wheels mounted to the rearward end of the respective arm about a generally upright pivot axis so that each said wheel support and wheels mounted thereon will pivot about said upright pivot for steering movement, a link extending rearwardly of said wheel support for each of the wheel assemblies, and means connected between rear ends of the links of each pair, so that upon movement of one of the links to move the connected wheel support about an upright axis the other wheel support in that pair will move about its upright axis as well, and means for selectively raising and lowering all of the wheel assemblies adjacent one side of the main frame with respect to the other side about the generally horizontal axis to permit leveling the main frame.

12. The apparatus of claim 11 wherein said cylindrical object comprises a silo defined by an annular wall, and spider means mountable on the interior of the silo wall to support the wall from the interior against external forces.

13. The apparatus as specified in claim 1 wherein said wheel means comprise separate sets of wheels on opposite sides of the machine, and means to selectively control the raising and lowering of the machine and the leveling thereof by operating the wheels on opposite sides of the machine independently of each other.

14. The apparatus as specified in claim 1, and a roller cage assembly mounted between the upper flange of each main side frame member, and said second subframe side members mounted on the respective upper flange, the second subframe side members having means forming a surface generally parallel to and facing the flange to engage and be supported on said roller cage.

15. The apparatus as specified in claim 11 wherein there are at least three pairs of wheel support assemblies, being mounted on separate cross members, and wherein the means to connect the drag links of the wheel assemblies comprise coupling cables for each of the separate pairs, and means to operate all of said coupling cables to pull on said drag links of all of the wheel assemblies simultaneously to provide for independent steering movement of the wheel assemblies.

16. The apparatus of claim 11 and stabilizer supports mounted on the subframe section pivoted to the main frame, and being extendable to engage the ground to provide support for the subframe when the subframe is in a vertical position, and retractable when not in use.

* * * * *